(12) United States Patent
Andersen et al.

(10) Patent No.: US 12,180,935 B2
(45) Date of Patent: Dec. 31, 2024

(54) ACTIVATING AND DEACTIVATING A SAFE MODE OF OPERATION OF A WIND TURBINE

(71) Applicant: Siemens Gamesa Renewable Energy A/S, Brande (DK)

(72) Inventors: Martin Folmer Andersen, Copenhagen (DK); Samuel Hawkins, Vejle (DK); Ryan A. Sievers, Lyons, CO (US)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 0 days.

(21) Appl. No.: 18/278,271

(22) PCT Filed: Feb. 24, 2022

(86) PCT No.: PCT/EP2022/054613
§ 371 (c)(1),
(2) Date: Aug. 22, 2023

(87) PCT Pub. No.: WO2022/184537
PCT Pub. Date: Sep. 9, 2022

(65) Prior Publication Data
US 2024/0318630 A1     Sep. 26, 2024

(30) Foreign Application Priority Data

Mar. 1, 2021 (EP) .................................. 21160016

(51) Int. Cl.
F03D 7/02 (2006.01)
(52) U.S. Cl.
CPC ......... F03D 7/0268 (2013.01); F03D 7/0204 (2013.01); F03D 7/0224 (2013.01);
(Continued)

(58) Field of Classification Search
CPC .... F03D 7/0268; F03D 7/0224; F03D 7/0204; F05B 2270/1077; F05B 2270/32; F05B 2270/331
See application file for complete search history.

(56) References Cited

U.S. PATENT DOCUMENTS

| | | | | |
|---|---|---|---|---|
| 2014/0203563 A1* | 7/2014 | Bowyer | ............... | F03D 7/0268 290/44 |
| 2015/0147173 A1* | 5/2015 | Agarwal | ............... | F03D 7/0268 416/43 |

(Continued)

FOREIGN PATENT DOCUMENTS

| | | |
|---|---|---|
| CN | 110 374 807 B | 2/2021 |
| EP | 2 233 736 A2 | 9/2010 |

(Continued)

OTHER PUBLICATIONS

European Search Report for EP 21160016.8 issued on Aug. 31, 2021.

(Continued)

*Primary Examiner* — David E Sosnowski
*Assistant Examiner* — Theodore C Ribadeneyra
(74) *Attorney, Agent, or Firm* — Schmeiser, Olsen & Watts LLP (57) ABSTRACT

A method of activating and/or deactivating a safe mode of operation of a wind turbine is provided, the method including: receiving at least one measurement signal related to a weather condition; filtering of a measuring signal dependent quantity to obtain a filtered signal, wherein the filtered signal depends on whether the measuring signal dependent quantity and/or filtered signal is increasing or decreasing with time; activating and/or deactivating the safe mode of operation based on the filtered signal.

15 Claims, 5 Drawing Sheets

(52) U.S. Cl.
CPC ... *F05B 2270/1077* (2020.08); *F05B 2270/32* (2013.01); *F05B 2270/331* (2013.01)

(56) References Cited

U.S. PATENT DOCUMENTS

| | | |
|---|---|---|
| 2019/0162165 A1 | 5/2019 | Niss et al. |
| 2020/0263660 A1* | 8/2020 | De Boer ............... F03D 7/0268 |
| 2021/0017957 A1* | 1/2021 | Messing ............... F03D 7/0224 |

FOREIGN PATENT DOCUMENTS

| | | |
|---|---|---|
| EP | 2 705 252 A1 | 3/2014 |
| EP | 3 502 463 A1 | 6/2019 |
| WO | 2012/152280 A1 | 11/2012 |

OTHER PUBLICATIONS

International Search Report & Written Opinion for PCT/EP2022/054613 issued on Jun. 10, 2022.

\* cited by examiner

ACTIVATING AND DEACTIVATING A SAFE MODE OF OPERATION OF A WIND TURBINE

CROSS-REFERENCE TO RELATED APPLICATIONS

This application claims priority to PCT Application No. PCT/EP2022/054613, having a filing date of Feb. 24, 2022, which claims priority to European Application No. 21160016.8, having a filing date of Mar. 1, 2021, the entire contents both of which are hereby incorporated by reference.

FIELD OF TECHNOLOGY

The following relates to a method and to a corresponding arrangement of activating and/or deactivating a safe mode of operation of a wind turbine. Furthermore, the following relates to a wind turbine comprising the arrangement.

BACKGROUND

A wind turbine, for example contained in a wind park, may be subjected to different environmental conditions, including normal environmental conditions where normal operation and production of electric energy is possible. However, a wind turbine may also be subjected to exceptional environmental conditions, involving high wind speed. The wind turbines need to be configured to respond to such exceptional environmental conditions. Therefore, a wind turbine may be designed to have a safe operation mode which increases the likelihood of avoiding damage during a severe weather event. This severe weather event might be a storm, or a tropical cyclone described as a rotating storm with a low-pressure center and a closed low-level atmospheric circulation with strong winds.

An operation mode designed to avoid damage due to a severe weather event may involve operation of the wind turbine in a way which deviates from the standard mode of operation. This may include bringing the wind turbine out of operation or orienting the wind turbine's components in a way which reduces the likelihood of damage.

Conventional methods may have monitored the wind speed and may have activated or deactivated a safe mode of operation depending on whether the measured wind speed is below or above a wind speed threshold.

Conventional methods may have deactivated the safe mode of operation before the end of the severe weather event. Conventionally, a threshold margin may have been used so that the threshold to deactivate the safe mode of operation is on the safe side of the threshold used to activate the safe mode of operation. However, when the threshold margin is used so that deactivation of the safe mode of operation only occurs at relatively low wind speed, also the activation of the safe mode of operation is performed already if the wind speed is relatively low. Thereby, production may be reduced. Conventionally, also a delay of fixed time lengths may have been used for deactivation, such that a deactivation will not occur before a predetermined duration of time has elapsed during which the deactivation criteria are fulfilled. However, thereby, also production may be reduced. Conventional methods may have used a time averaged value of for example the wind speed as a measured environmental condition. The conventional method may have activated the safe operation mode when the measurement or the averaged signal is above a predetermined threshold. The deactivation was conventionally performed, when the measurement or averaged signal is below the predetermined threshold. However, in the conventional methods, the above indicated problems may arise.

It has however been observed that the conventional methods of activating or deactivating the safe mode of operation do not in all situations ensure a secure or safe operation of the wind turbine.

Thus, there may be a need for a method and a corresponding arrangement of activating and/or deactivating a safe mode of operation of a wind turbine, wherein the wind turbine can be operated in a safe manner and is appropriately responding to changing weather conditions.

SUMMARY

An aspect relates to a method of activating and/or deactivating a safe mode of operation of a wind turbine, the method comprising: receiving at least one measurement signal related to a weather condition; filtering of a measuring signal dependent quantity to obtain a filtered signal, wherein the filtered signal and/or filtered signal depends on whether the measuring signal dependent quantity and/or filtered signal is increasing or decreasing with time; activating and/or deactivating the safe mode of operation based on the filtered signal.

In embodiments, the method may be implemented in software and/or hardware. In embodiments, the method may be performed by a module of a wind turbine controller for example. The safe mode of operation may comprise to set the wind turbine in an operation mode which reduces or even prohibits damage to components of the wind turbine which might occur due to a severe weather event, such as excessive wind speed and/or wind turbulence.

To activate the safe mode of operation may comprise to change the operation state of the wind turbine for example by changing orientation or setting of one or more components, such as the yaw angle, the blade pitch angles, a converter reference signal or a combination thereof or others. Activating the safe mode of operation may disable the production of electric energy and disable supply of electric energy to the utility grid. Activating the safe mode of operation may also involve disconnecting the wind turbine from the utility grid.

For example, to activate the safe mode of operation it may be beneficial to stop operation of a upwind-facing horizontal-axis wind turbine and orient it such that the rotor is downwind. In the downwind orientation it may be easier to ensure optimal orientation relative to the wind direction. In this orientation, however, the wind turbine may be unable to produce energy for the grid. It is, therefore, undesirable to have a normal upwind wind turbine in this orientation unless it is necessary. It also consumes power to orient the turbine to this downwind position and back again, which may cause a problem if the wind turbine is operating off-grid under battery or diesel power.

Another example for safe mode of operation is a downwind-facing horizontal-axis wind turbine with a cantilevered set of rotor blades that may fold or collapse inward in severe weather to reduce the cross-sectional surface area exposed to the wind. Another example is an upwind-facing horizontal-axis wind turbine with a cantilevered tail vane assembly.

Deactivating a safe mode of operation may involve restoring a normal operation of the wind turbine, wherein the wind turbine produces electrical energy and supplies it to a utility grid.

The measurement signal related to the weather condition may comprise information regarding wind speed, wind turbulence, atmospheric pressure, atmospheric pressure and/or pressure change across a particular distance, sun irradiance, rainfall and the like. The measurement signal related to the weather condition may in particular indicate the wind speed and/or wind turbulence and/or an atmospheric pressure or pressure change. The measurement signal may comprise an electrical/optical signal and/or a wireless signal.

The measuring signal dependent quantity may be a quantity which may depend on the measurement signal. In embodiments, the quantity may be equal to the measurement signal but in other embodiments, the measuring signal dependent quantity may be derivable from the measurement signal by processing and may be different from the measurement signal itself. The measuring signal dependent quantity may for example correspond to an average of the measurement signal over a particular time as explained below in more detail.

The measurement signal dependent quantity is then filtered (for example using a (low-pass) filter having an adjustable or settable time constant or other filter parameters) to obtain the filtered signal. If the measurement signal dependent quantity and/or filtered signal is increasing, the filtered signal may be different from the filtered signal when the measuring signal dependent quantity and/or filtered signal is decreasing with time. Thereby, different requirements for a desired activation and requirements for a desired deactivation of the safe mode of operation may be accounted for. In particular, a fast activation of the safe mode of operation may be achieved in order to reduce damage of components of the wind turbine. Furthermore, the deactivation of the wind turbine may be faster than conventionally performed, while components of the wind turbine are protected from damage by not deactivating the safe mode too early. Filtering may involve processing by a processor, for example utilizing appropriate software.

Embodiments of the present invention may achieve e.g., the following beneficial effects:
1. Ensure quick activation at the onset of a severe weather event.
2. Avoid early deactivation before the severe weather event has ended.
3. Avoid a long delay (and therefore a loss of production) after the severe weather event has ended.

According to an embodiment of the present invention, the method further comprises activating the safe mode of operation if the filtered signal is above or below an activation threshold; and/or deactivating the safe mode of operation if the filtered signal is below or above a deactivation threshold different from the activation threshold.

When the safe mode of operation is activated and/or deactivated based on the filtered signal, the increase for example of wind speed or the decrease of wind speed with time may in a more improved manner be accounted for by setting a criterion for activation or deactivation of the safe mode of operation. Thereby, components of the wind turbines may be protected from damage and furthermore production efficiency may be improved.

If the filtered signal is above the activation threshold, further operation according to normal production would possibly damage components of the wind turbine. Therefore, activating the safe mode of operation will protect components of the wind turbine from damage. When the safe mode of operation is deactivated (and possibly a normal operation mode involving producing electric energy is entered), if the filtered signal is below a deactivation threshold, the prevailing weather condition, in particular wind speed, is not expected to damage components of the wind turbine. Therefore, normal operation may be resumed in order to continue to produce and supply electric energy to the utility grid.

When the deactivation threshold is different from the activation threshold, the flexibility of the method may be increased and adaptation to the expected environmental characteristics and characteristic of the wind turbine may be enabled. E.g., the activation threshold may be set to be higher than the deactivation threshold. Thereby, secure operation of the wind turbine may be enabled while ensuring to improve energy production.

According to an embodiment of the present invention, filtering includes, in particular low-pass filtering, employing a filter parameter, wherein the filter parameter comprises a filter time constant being different for an increasing or decreasing measurement signal dependent quantity and/or filtered signal.

Low-pass filtering may be implemented in a number of different manners. The filter being used may comprise a multi-rate filter which may apply a low-pass filtering.

In embodiments, the method may involve a predetermined activation threshold and a predetermined deactivation threshold based on one or more signals associated with an environmental condition (e.g., wind speed, atmospheric pressure, etc.) The measured environment condition(s) may be converted into a filtered signal through the use of a multi-rate filter. This multi-rate filter may determine its output using different filter parameters depending on whether the input measurement and/or filtered signal is increasing or decreasing. The safe mode of operation may become activated when the filtered signal is beyond the predetermined activation threshold and may become deactivated when the filtered signal is beyond the predetermined deactivation threshold in the opposite direction.

For cases where the activation requires an exceedance of an activation threshold, the multi-rate filter may only apply light low-pass filtering to increasing inputs of the measured condition and/or filtered signal. Light filtering may imply that the filter would have a small time constant, $\tau$, when filtering input signals. The filter could be such that there is no filtering of increasing input signals and/or filtered signal, i.e., $\tau=0$. This case may be referred to as an envelope filter. This may ensure that as the measured condition exceeds the threshold for activation the safe mode of operation is quickly activated with little or no delay.

The multi-rate filter may have a larger amount of low-pass filtering for decreasing inputs and/or filtered signal. The time constant here could be on the order of $\tau=1$ to 4 hours. This ensures that a rapid decrease in the measured condition does not result in corresponding rapid decrease in the filtered signal used in evaluation against the deactivation threshold. For gradual decreases in the measured input into the filter, the filtered output may only deviate slightly.

For cases where the activation of the safe mode of operation requires a signal to fall below an activation threshold, then the filtering of increasing and decreasing signals and/or filtered signal as described in the previous two paragraphs is reversed.

The benefit to this approach may be that a severe weather event usually ends with a gradual change in a measured environmental condition, such as wind speed.

The low-pass filtering of the measured signal when it is changing in the direction of the deactivation threshold may ensure that there is little delay from the end of the weather event to the return of operation. This is because fixed time delays, large threshold margins and/or long-duration averaging may not be needed to avoid deactivation due to short-duration behavior of the measured signal.

The filtered signal (e.g., $y_i$, e.g., output by a filter module) at a discrete time step i may depend on the measuring signal dependent quantity at this time step e.g., $u_i$) and/or at a previous time step (e.g., $u_{i-1}$) and/or may depend on the filtered signal (e.g., $y_{i-1}$) at the previous time step, in particular in a linear manner. Filter coefficients (e.g., $B_0$ and $B_1$) may be defined by a time constant (e.g., $\tau$), and the time duration between samples (timestep), $\Delta t$. The time constant may be dependent on whether the output $y_i$ is larger or smaller than the previous output sample, $y_{i-1}$.

When the filtered time constant is set to be different for an increasing or decreasing measurement signal dependent quantity and/or filtered signal, the activation of the safe mode of operation may be performed without much delay after the weather condition changes to a potentially damaging condition. Thus, a quick activation at the onset of a severe weather event may be ensured.

Further, when the filter time constant for the decreasing measurement signal dependent quantity and/or filtered signal is set to a larger value than the filter time constant set or utilized for the increasing measurement signal dependent quantity and/or filtered signal, it may be avoided to too early deactivate the safe mode of operation before the severe weather event has ended. Nevertheless, a long delay after the severe weather event has ended may also be avoided by appropriately setting the filtered time constant for the decreasing measurement signal dependent quantity and/or filtered signal.

According to an embodiment of the present invention, for the case that the safe mode of operation is activated, if the filtered signal is above the activation threshold and the safe mode of operation is deactivated, if the filtered signal is below the deactivation threshold, the following applies: the time constant is set to a low time constant when the measuring signal dependent quantity and/or filtered signal is increasing; and the time constant is set to a high time constant when the measuring signal dependent quantity and/or filtered signal is decreasing, wherein the high time constant is greater than the low time constant.

The low time constant of the filter which is set when the measurement signal dependent quantity and/or filtered signal is increasing may ensure that deactivation or activation of the safe mode of operation is performed with only low or even without any delay, e.g., with only small delay after the measurement signal indicates a potentially damaging weather condition, such as too high wind speed. Further, when the time constant is set to the high time constant when the measurement signal dependent quantity and/or filtered signal is decreasing, a premature deactivation of the safe mode of operation may be avoided.

A low-pass filter may have the effect that when there are rapid changes in an input signal, the output signal will adjust gradually. Rapid changes in the time domain, require high frequency content in the frequency domain. So, if high frequency content of an input signal is filtered out, the output is prevented from changing rapidly.

The high time constant may for example be chosen depending on the particular application. The same holds for the low time constant.

The predetermined thresholds for activation and deactivation may have different values, such that there is a margin between the activation of the safe operation mode and the deactivation. After the filtered signal is beyond the activation threshold, the mode will stay active until the filtered signal has returned past the activation threshold to reach the deactivation threshold. The margin does not need to be large and for the example of wind speed measurements may only be 5-10 m/s between the two thresholds.

According to an embodiment of the present invention, the activation threshold is greater than the deactivation threshold, wherein the activation threshold is in particular between 1.2 and 2.0 time the deactivation threshold.

When the activation threshold is greater than the deactivation threshold, activation of the safe mode of operation may not be entered too early and deactivating the safe mode of operation may also not be entered too early, i.e., while potentially the severe weather event is not ended.

According to an embodiment of the present invention, for the case that the safe mode of operation is activated, if the filtered signal is below the activation threshold and the safe mode of operation is deactivated, if the filtered signal is above the deactivation threshold, the following applies: the time constant is set to a high time constant when the measuring signal dependent quantity and/or filtered signal is increasing; and the time constant is set to a low time constant when the measuring signal dependent quantity and/or filtered signal is decreasing, wherein the high time constant is greater than the low time constant.

This embodiment might be considered as a reverse setting compared to the previously described embodiment, wherein activation is performed for the filtered signal to be below the activation threshold and deactivation is performed for the filtered signal to be above the deactivation threshold. Otherwise, effects of the described embodiments may be similar to those described with the previously described embodiment.

According to an embodiment of the present invention, the low time constant is between 0 and 60 minutes, in particular between 0 and 10 minutes, and/or wherein the high time constant is between 30 minutes and 300 minutes, in particular between 60 minutes and 180 minutes.

Thereby, typical time values are provided which have been found by simulation and application to historical wind data to be appropriate for safely controlling the wind turbine. Other time values may be possible.

According to an embodiment of the present invention, filtering of the measuring signal dependent quantity comprises: averaging the measurement signal over a predetermined averaging time to obtain an averaged signal; filtering the averaged signal to obtain the filtered signal.

The averaged signal may therefore also have less high frequency components than the measurement signal itself. Thereby, a kind of smoothing may be applied. Thereby, reliability of the method may be improved. The averaging may comprise for example also a weighted averaging in that the weighting of the past values of the measurement signals are accounted for or considered with less strength than values of the measurement signals closer to the present point in time. In other embodiments, a simple averaging may be performed without performing a waiting.

The measured signal(s) may be pre-filtered by e.g., an averaging window. However, the averaging time does not need to be on the order of hours and may be as short as 5 to 10 minutes. Especially in the case of wind speed measurements, this may ensure that fluctuations (e.g., due to turbulence) do not lead to inadvertent activations and/or deactivations. A 10-minute averaging of the input signal may also not have a significant effect on the delay of operation at the end of the severe weather event.

According to an embodiment of the present invention, the predetermined averaging time is between 120 sec and 700 sec, in particular between 550 sec and 650 sec.

These values have been found by simulation to be appropriate according to embodiments of the present invention.

According to an embodiment of the present invention, filtering of the measuring signal dependent quantity comprises: limiting the measurement signal dependent quantity to be equal or greater than a floor value (e.g., V_0) not greater than the activation threshold; or limiting the measurement signal dependent quantity to be equal or lower than a ceiling value (V_0) not lower than the deactivation threshold; the method further comprising: filtering the limited measuring signal dependent quantity.

Limiting the measurement value to be equal or greater than the floor value may further improve the method and in particular the reliability and safety and/or robustness. The ceiling value would be applied, if activation occurs below the activation threshold and deactivation occurs above the deactivation threshold. Furthermore, by using this implementation or embodiment, result of the filtering may be more restricted and predictable.

According to an embodiment of the present invention, the measurement signal related to the weather condition comprises a measurement signal of at least one of the following: a wind speed, an atmospheric pressure, a load on rotor blade and/or tower; a thrust on turbine rotor.

The weather condition may be measured by one or more measurement sensors installed at components of the wind turbine or for example at a met mast. Thereby, conventionally, available measurement signals may be utilized in embodiments of the present invention, thereby simplifying the method.

According to an embodiment of the present invention, the method is applied to plural types of measurement signals each being associated with respective type dependent filter parameter and activation and deactivation threshold. In embodiments, the method may be improved regarding reliability and adaptation to the particular application.

According to an embodiment of the present invention, activating and/or deactivating the safe mode of operation comprises supplying a control signal to at least one actuator for establishing the safe mode of operation, wherein a safe mode of operation comprises at least one of: shutting down the wind turbine; folding leewards (downwind) at least one rotor blade; adjusting a blade pitch angle of at least one rotor blade to a feathered position; adjusting or allowing to adjust the yaw to a downwind position; idling in yaw downwind position; disconnecting the wind turbine from the electrical grid; securing and/or braking the rotor.

The actuator may for example be configured for adjusting a yaw angle defining an azimuthal angle of the nacelle relative to the wind turbine tower. In other embodiments, the actuator may comprise an actuator for a blade pitch angle readjustment. The actuator may additionally or alternatively also actuate one or more breakers for example for disconnecting or connecting the wind turbine to a utility grid. Idling in the yaw downwind position may involve stopping production of electric energy. Then the wind turbine rotor does not face anymore the wind, as is in the normal operation, but the rotor will be oriented in the opposite direction. In particular, the hub where the rotor blades are connected may be oriented leewards (downwind) in the safe mode of operation.

It should be understood that features, individually or in any combination, disclosed, explained, described or provided for a method of activating and/or deactivating a safe mode of operation of a wind turbine, are also, individually or in any combination, applicable to an arrangement for activating and/or deactivating a safe mode of operation of a wind turbine according to embodiments of the present invention and vice versa.

According to an embodiment of the present invention it is provided an arrangement for activating and/or deactivating a safe mode of operation of a wind turbine, the arrangement comprising: an input module configured to receive at least one measurement signal related to a weather condition; a processor configured: to filter a measuring signal dependent quantity to obtain a filtered signal, wherein the filtered signal depends on whether the measuring signal dependent quantity and/or filtered signal is increasing or decreasing with time; to derive at least on control signal for activating and/or deactivating the safe mode of operation based on the filtered signal.

The arrangement may for example be a portion of a wind turbine controller.

According to an embodiment of the present invention it is provided a wind turbine, comprising: a tower; a nacelle mounted on top of the tower; a rotor harboured in the nacelle; plural rotor blades mounted on the rotor; an arrangement according to the preceding embodiment; a measurement sensor configured to generate the measurement signal in dependence of a weather condition; an actuator for receiving the control signal.

The aspects defined above and further aspects of embodiments of the present invention are apparent from the examples to be described hereinafter and are explained with reference to the examples. Embodiments of the invention will be described in more detail hereinafter with reference to examples but to which the invention is not limited.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

Figure 1:
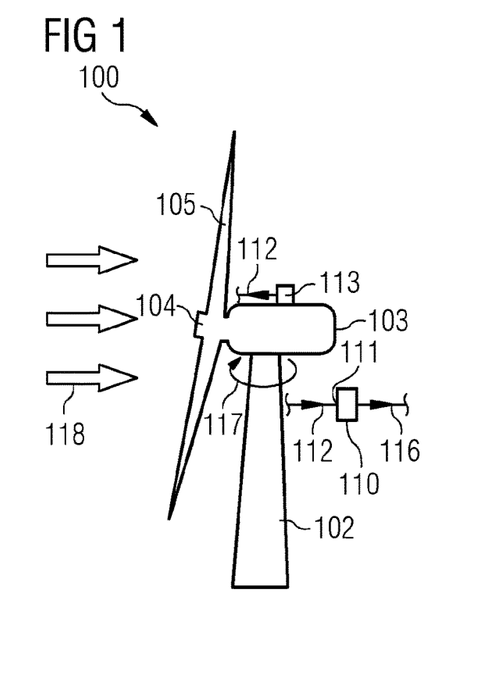
FIG. 1 schematically illustrates a wind turbine according to an embodiment of the present invention in a first operation mode.

The wind turbine 100 schematically illustrated in FIG. 1 according to an embodiment of the present invention comprises a wind turbine tower 102, a nacelle 103 mounted on top of the tower 102 and a rotor 104 having plural rotor blades 105 mounted thereon. The wind turbine 100 further comprises an arrangement 110 according to an embodiment of the present invention for activating/deactivating a safe mode of operation of the wind turbine 100. The arrangement 110 may for example be installed within the nacelle 103.

The arrangement 110 comprises an input terminal 111 for receiving a measurement signal 112 which is related to a weather condition. The measurement signal 112 may for example be generated by a wind speed sensor 113 which may be mounted at the nacelle 103. The arrangement 110 comprises a not illustrated processor which is configured to filter a measuring signal dependent quantity (i.e., a quantity which depends on the measurement signal 112) to obtain a filtered signal.

The filtered signal is for example indicated in FIGS. 6, 7, 8, 9, 11 and is thereby denoted or labelled with reference sign ending with the digits 15 and followed by a letter. Such a filtered signal is for example illustrated in FIG. 6 and labelled with reference signs 615a, . . . , 615d. The arrangement 110 is further configured for deriving at least one control signal 116 for activating and/or deactivating the safe mode of operation based on the filtered signal (for example signals 615a, . . . , 615d illustrated in FIG. 6). The control signal 116 may be supplied to a not in detail illustrated yawing system which may be configured to change a yawing angle of the nacelle as indicated by the arrow 117.

Figure 2:
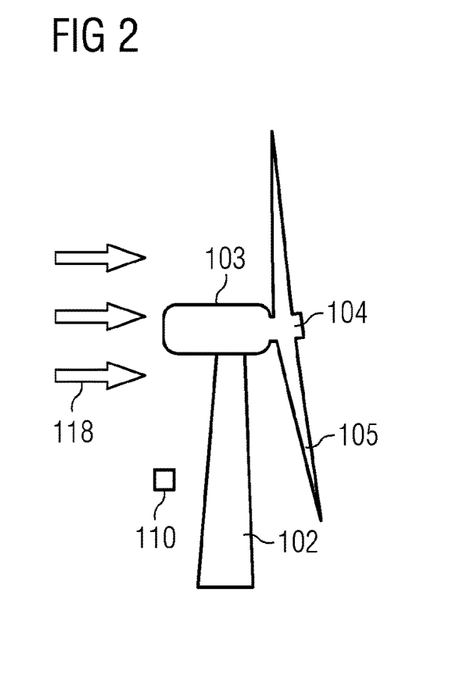
FIG. 2 schematically illustrates a wind turbine according to an embodiment of the present invention in a second operation mode.

Thereupon, for activating the safe mode of operation illustrated in FIG. 2, the control signal 116 may cause a yawing system to rotate the nacelle 103 around the vertical longitudinal axis of the wind turbine tower 102 from the normal orientation as depicted in FIG. 1 to the downwind position as illustrated in FIG. 2. As can be appreciated from FIG. 1, the wind 118 impacts on the rotor blades 105 for normal energy production, while the wind 218 in FIG. 2 hits the wind turbine from the back, since the wind turbine is in the yaw downwind position. In FIG. 1, the hub at which the rotor blades 105 are mounted faces the wind 118, while in FIG. 2, the hub is in an opposite direction.

Beside changing the yaw position of the nacelle for entering the safe mode of operation, further actuations may be performed according to embodiments of the present invention, for example adjusting blade pitch angle for example.

Figure 3:
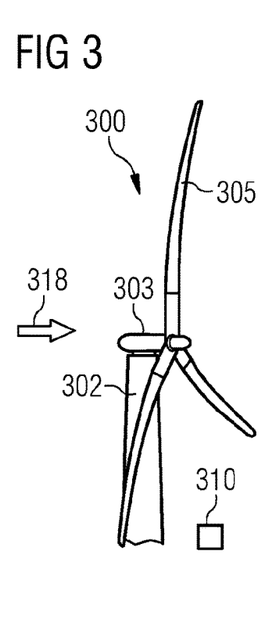
FIG. 3 schematically illustrates a wind turbine according to an embodiment of the present invention in an operation transition state.
Figure 4:
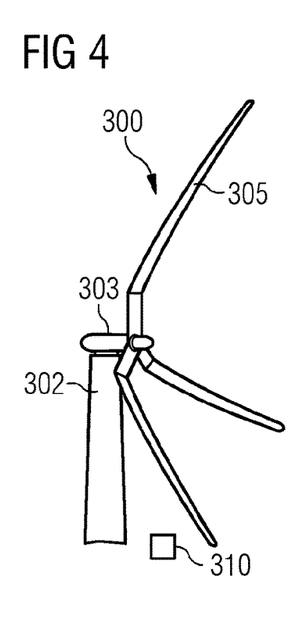
FIG. 4 schematically illustrates a wind turbine according to an embodiment of the present invention in an operation transition state.
Figure 5:
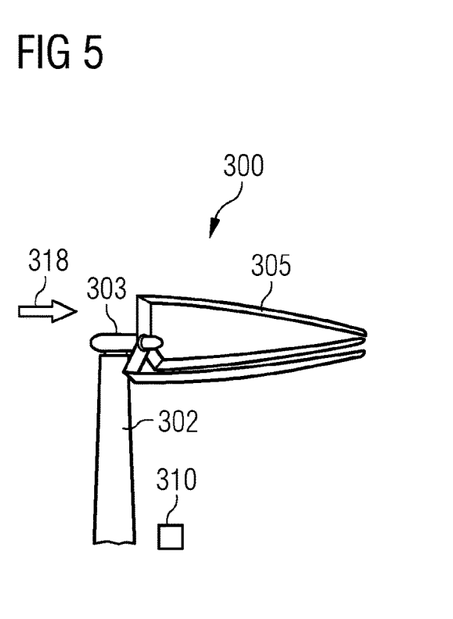
FIG. 5 schematically illustrates a wind turbine according to an embodiment of the present invention in an operation transition state.

FIGS. 3, 4 and 5 illustrate further embodiments of entering a safe mode of operation. Therein, the wind turbine 300 comprises rotor blades 305 which may fold or collapse inward in a severe weather event to reduce the cross-sectional surface area exposed to the wind. Thereby, in FIG. 3, the wind turbine 300 is already adjusted in a yaw downwind position. In FIGS. 4 and 5, further steps of the folding process of the rotor blades 305 are illustrated. In FIG. 5, entering the safe mode of operation is completed. Also, wind turbine 300 illustrated in FIGS. 3, 4 and 5 comprises an arrangement 310 for activating and/or deactivating a safe mode of operation which may be configured and function in a similar manner as has been described with reference to FIGS. 1 and 2.

A heavy weather event may for example comprise a tropical cyclone having an eye in the center. When the wind turbine is within the eye of the center, the wind turbine may experience relatively low wind speed. In conventional methods, the method may mistakenly consider the calm conditions within the eye as evidence that the tropical cyclone has completely passed and is over. Thereby, conventionally, the wind turbine may experience potentially hazardous, time-consuming and/or energy-consuming situations. Within the eye, the wind speed may considerably drop from the peaks at the eye wall to the relative calm of the hurricane eye. A safe operation mode that activates based only upon measured wind speed as has been conventionally applied, may mistakenly deactivate during this period of low wind. Other heavy weather conditions which may be addressed in embodiments of the present invention may comprise multi-cell thunderstorms, where periods of relative calm may occur within a severe weather system.

FIGS. 6, 7, 8, 9 illustrate graphs as considered in embodiments of a method of activating and/or deactivating a safe mode of operation of a wind turbine according to embodiments of the present invention.

Figure 6:
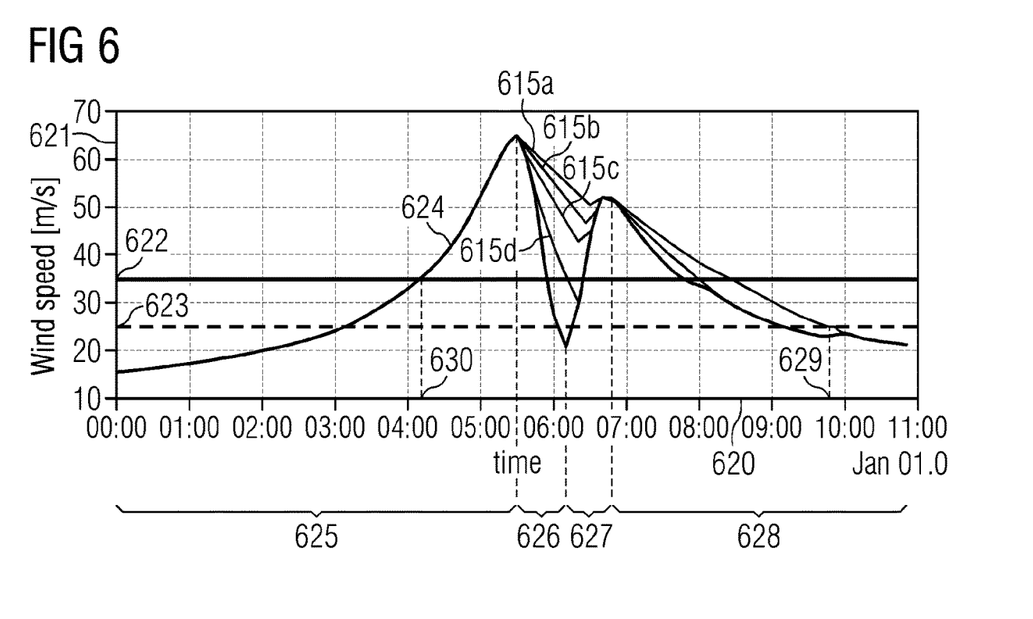
FIG. 6, illustrates a graph for explaining activation and deactivation of a safe mode of operation of a wind turbine according to embodiments of the present invention for a weather event in the past by simulation.
Figure 7:
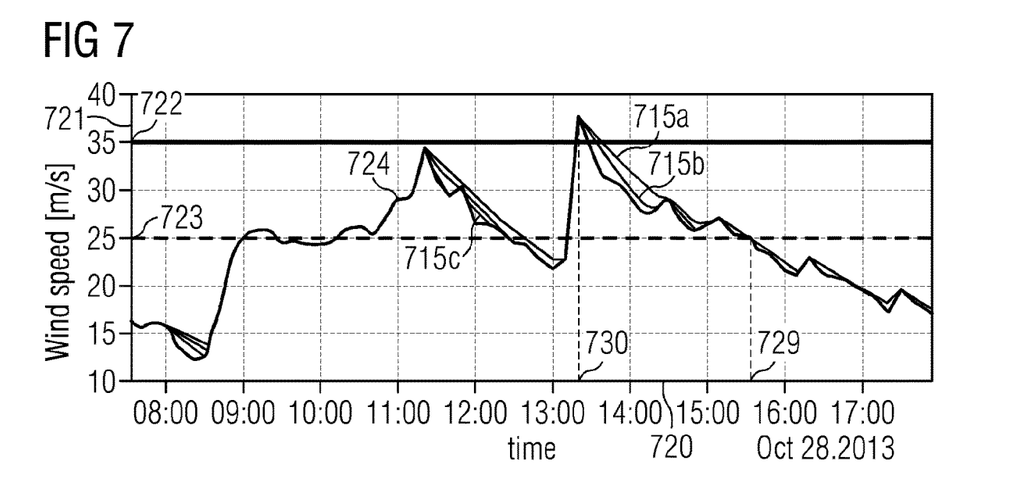
FIG. 7 illustrates a graph for explaining activation and deactivation of a safe mode of operation of a wind turbine according to embodiments of the present invention for a weather event in the past by simulation.
Figure 8:
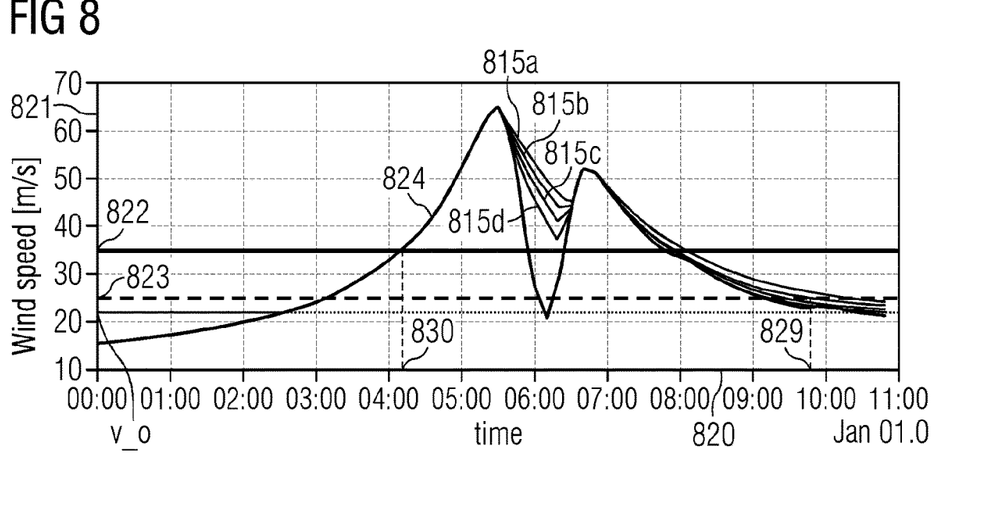
FIG. 8 illustrates a graph for explaining activation and deactivation of a safe mode of operation of a wind turbine according to embodiments of the present invention for a weather event in the past by simulation.
Figure 9:
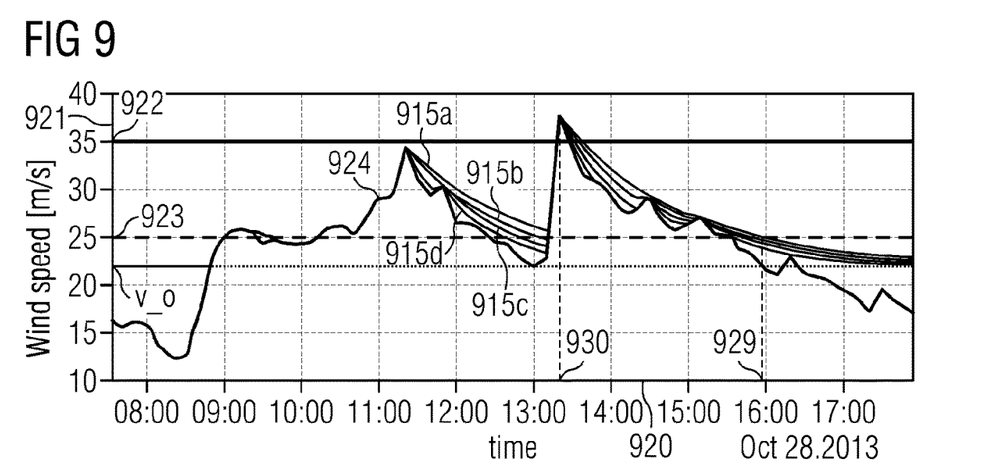
FIG. 9 illustrates a graph for explaining activation and deactivation of a safe mode of operation of a wind turbine according to embodiments of the present invention for a weather event in the past by simulation.

Therein, corresponding abscissas 620, 720, 820, 920 indicate the time while ordinates 621, 721, 821, 921 indicate the wind speed, as for example measured by wind speed sensor 113 illustrated in FIG. 1. An activation threshold 622 as well as a deactivation threshold 623 are defined as depicted in FIG. 6. Corresponding thresholds are also depicted in FIGS. 7, 8 and 9, their reference sign differing only in the first digit. Those thresholds may be set to be different or may be set to be the same and may be selected or set depending on the particular application. Those thresholds may for example be set depending on the geographical location, expected weather conditions, expected wind speeds and so forth.

The thick curves 624, 724, 824, 924 in FIGS. 6, 7, 8, 9 label the wind speed averaged over an average time duration of 600 seconds. This wind speed average may represent a measuring signal dependent quantity according to embodiments of the present invention.

FIG. 6 indicates measurement and simulation values from a tropical cyclone. In a time interval 625 illustrated in FIG. 6, the average wind speed 624 increases, while in a time interval 626, the average wind speed 624 decreases. According to embodiments of the present invention, different filterings are applied in the time period 625 (average wind speed is increasing) in the time period 626 (average wind speed is decreasing). According to the depicted embodiment, a time constant t of a filter is set to zero in the time window 625 as well as in other time windows or time intervals 627 in which the average wind speed is also increasing. In contrast, in the time intervals 626, 628, where the average wind speed 624 is decreasing, the curves 615a, 615b, 615c, 615d are indicated corresponding to filtering results with time constants of $\tau=1$ h, 2 h, 3 h, 4 h, respectively. The filtering with increased time constants in the time intervals 626, 628 results in the avoidance of too early deactivation of the safe mode of operation. Deactivation of the safe mode of operation occurs when selected one of the curves 615a, . . . , 615d representing a filtered signal, drops below the deactivation threshold 623. In the illustrated embodiment, deactivation may for example occur at the point in time 629 when curve 615a crosses the horizontal line representing the deactivation threshold 623. Other embodiments may select another of the curves 615a, . . . , 615d as filtered signal that is compared with the deactivation threshold 623.

Activation of the safe mode of operation is performed, when the averaged wind speed (corresponding to a filtered value obtained by filtering with a time constant of $\tau=0$) crosses and exceeds the activation threshold 622. Activation of the safe mode of operation occurs at the time point 630 in FIG. 6 at which point in time the averaged wind speed 624 crosses the horizontal line representing the activation threshold 622.

In FIG. 6, the activation threshold 622 is set at a wind speed of 35 m/s, while the deactivation threshold 623 is set at a value of a wind speed value of 25 m/s.

FIG. 7 comprises data from an extra-tropical storm. In FIG. 7, activation of the safe mode of operation occurs at the point in time 730 and deactivation occurs at the point in time 729.

The embodiments illustrated in FIGS. 8 and 9 further comprise to define and employ a floor value V_0 defining the minimum input value to a filter which is utilized for deriving the filtered signal. The floor value V_0 illustrated in FIGS. 8 and 9 is set at a value of 22 m/s, i.e., is below the deactivation threshold 823 and further also below the activation threshold 822. In FIG. 8, activation of the safe mode of operation is entered at a point in time 830 and deactivation is entered in a point in time 829.

As can be appreciated from FIGS. 8 and 9, the filtered signals 815a, . . . , 815d and 915a, . . . , 915d representing filtered signals as derived in embodiments of the present invention, are different from the filtered signals 615a, . . . , 615d, 715a, . . . , 715d, as derived in the embodiments illustrated in FIGS. 6 and 7. In embodiments, the method for activating/deactivating the safe mode of operation may further be tuned in accordance to the particular application.

Figure 10:
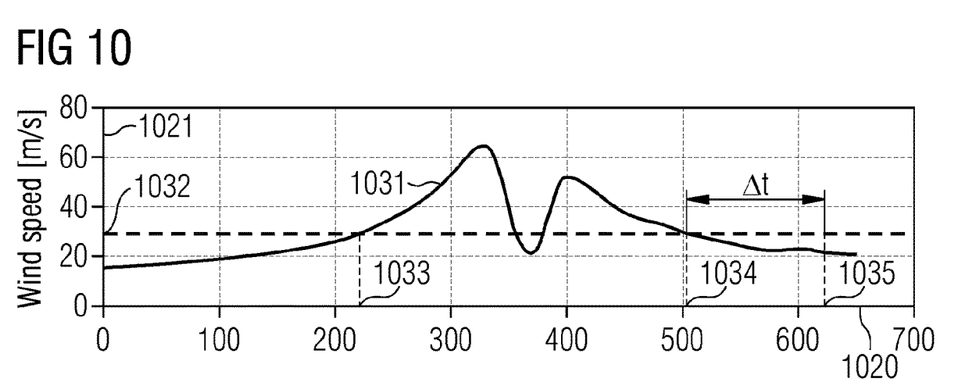
FIG. 10 illustrates activation and deactivation of a safe mode of operation according to the conventional art and according to an embodiment of the present invention respectively.
Figure 11:
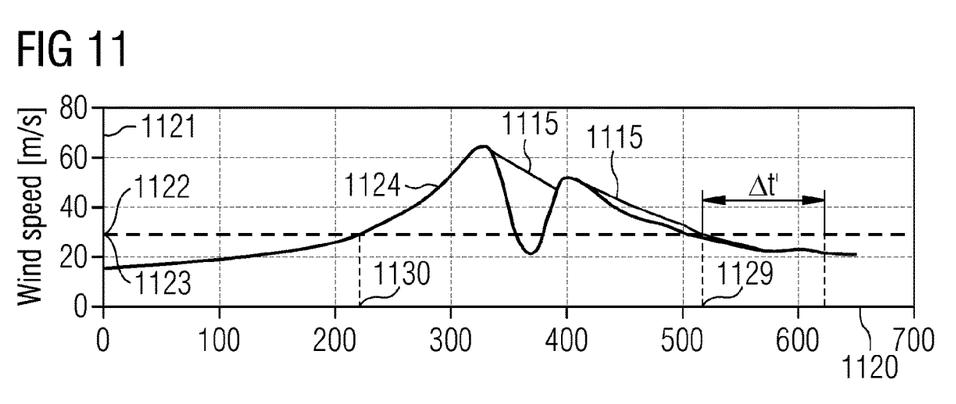
FIG. 11 illustrates activation and deactivation of a safe mode of operation according to the conventional art and according to an embodiment of the present invention respectively.

FIGS. 10 and 11 illustrate in comparison a conventional method and a method according to an embodiment of the present invention for addressing activation and/or deactivation of a safe mode of operation. Therein, the abscissas 1020, 1120 indicate time while the ordinates 1021, 1121 indicate the wind speed.

The curve 1031 in FIG. 10 represents an average of a wind speed and the quantity 1032 represents a conventionally used speed threshold. Conventionally, activation occurs at the point in time 1033 where the wind speed 1031 crosses the threshold 1032. At a point in time 1034, the wind speed crosses for a second time the threshold 1032. Conventionally, a time interval or delay time $\Delta t$ is waited before the safe mode of operation is deactivated at a point in time 1035. Thereby, a relatively large delay may lead to a considerable reduction of energy output.

The curve 1115 represents a filtered signal which is derived based on filtering the averaged wind speed 1124 for time durations in which the averaged wind speed 1124 decreases. According to embodiments of the present invention, the filtered signal 1115 derived from the average wind speed 1124 is considered for deactivation. Activation may occur at the point in time 1130, where the average wind speed 1124 crosses and exceeds the activation threshold 1122. Deactivation of the safe mode of operation occurs at the point in time 1129 at which the filtered signal 1115 crosses and lies below the activation threshold 1122 which is equal in the present embodiment to the deactivation threshold 1123. Thereby, as can be appreciated from FIGS. 10 and 11, the point in time 1129 where the normal operation may be resumed, is by a time duration $\Delta t'$ earlier than the point in time 1035 where the normal operation is resumed according to a conventional method.

Below further details of particular embodiments are disclosed to which the invention is not restricted:

For the case where activation of the safe operation mode is related to an exceedance of the activation threshold, a limit may be used for the input to the multi-rate filter such that the input value may not be lower than a predetermined floor not greater than the deactivation threshold.

This floor can be used to ensure that the rate at which the filtered signal changes in response to decreases in the input signal is not affected by deep decreases in the signal. (An example of this floor is shown in FIGS. 8 and 9 as V_0). For the case where activation of the safe operation mode is related to a condition falling below the activation threshold then the floor would act instead as a ceiling not lower than the deactivation threshold. One or more signals may be used for activation and deactivation of the safe mode of operation.

The use of multiple measured conditions may be done in different ways. For example, wind speed, atmospheric pressure, load sensors on the rotor blades or tower, or thrust measurements on the turbine rotor may be used to activate and deactivate a safe operation mode during a tropical cyclone. One or more of these measured signals could be treated as described in this method and compared against unique activation and deactivation thresholds. The activation and deactivation conditions could then be combined using Boolean logic such that activation occurs when any signal's activation threshold is reached, and deactivation occurs only when all signals' deactivation threshold is reached. Other Boolean combinations could be used where appropriate.

Similarly, multiple measured signals could be used to improve the accuracy of a single signal treated by the method described here. In the example of the tropical cyclone again, the atmospheric pressure measurement and rotor blade load measurements could be used to improve the accuracy of the measured wind speed signal through the use of state estimation from measurements and mathematical models, such as observers and Kalman Filters.

In the embodiments illustrated in FIGS. 6 to 9 the 10-minute average of the wind speed is used as input to a multi-rate filter. The filter has a time constant of $\tau=0$ for increasing wind speeds and results are shown for different time constants for decreasing wind speeds: $\tau=1, 2, 3, 4$ hours. The activation threshold is set to 35 m/s and the deactivation threshold is set to 25 m/s. In FIGS. 6 and 7, a floor V0 on the input signal to the multi-rate filter is set to 0 m/s (i.e., no floor) and in FIGS. 8 and 9 a floor of V0=22 m/s is used.

The effect of the method is clear to see in the figures below. In FIG. 6, by setting a time constant of only 1 hour the safe mode of operation is not deactivated by the wind speed decrease during the eye of the tropical cyclone. When the tropical cyclone is finally over, the wind speed is decreasing at a slower rate and there is no additional delay due to the filtering for all but the case with a 4-hour time constant. This remains the case for the extra-tropical storm (FIG. 7). As the wind speeds decrease below there is little to no delay.

FIGS. 8 and 9 are included just to show the effect of changing the floor V0.

Using conventional solutions to avoid deactivation of a safe operation mode due to the eye of a tropical cyclone, could result in a significant delay in returning to operation after the cyclone's passing. The eye of a tropical cyclone is typically 30-65 km in diameter but may range from just a few kilometers to very large diameters such as 370 km for Typhoon Carmen (1960). The eye typically progresses at around 25 to 30 km/h, meaning that the duration of relative calm experienced by a wind turbine may last from one to a few hours. This would require a very large averaging window or fixed delay to avoid deactivation. Wind speeds in the eye can be very low, meaning that a margin would need to be very large to avoid deactivation. These deactivation conditions would lead to significant delays in returning to operation at the end of the severe weather event. The described solution has therefore been developed.

Figure 12:
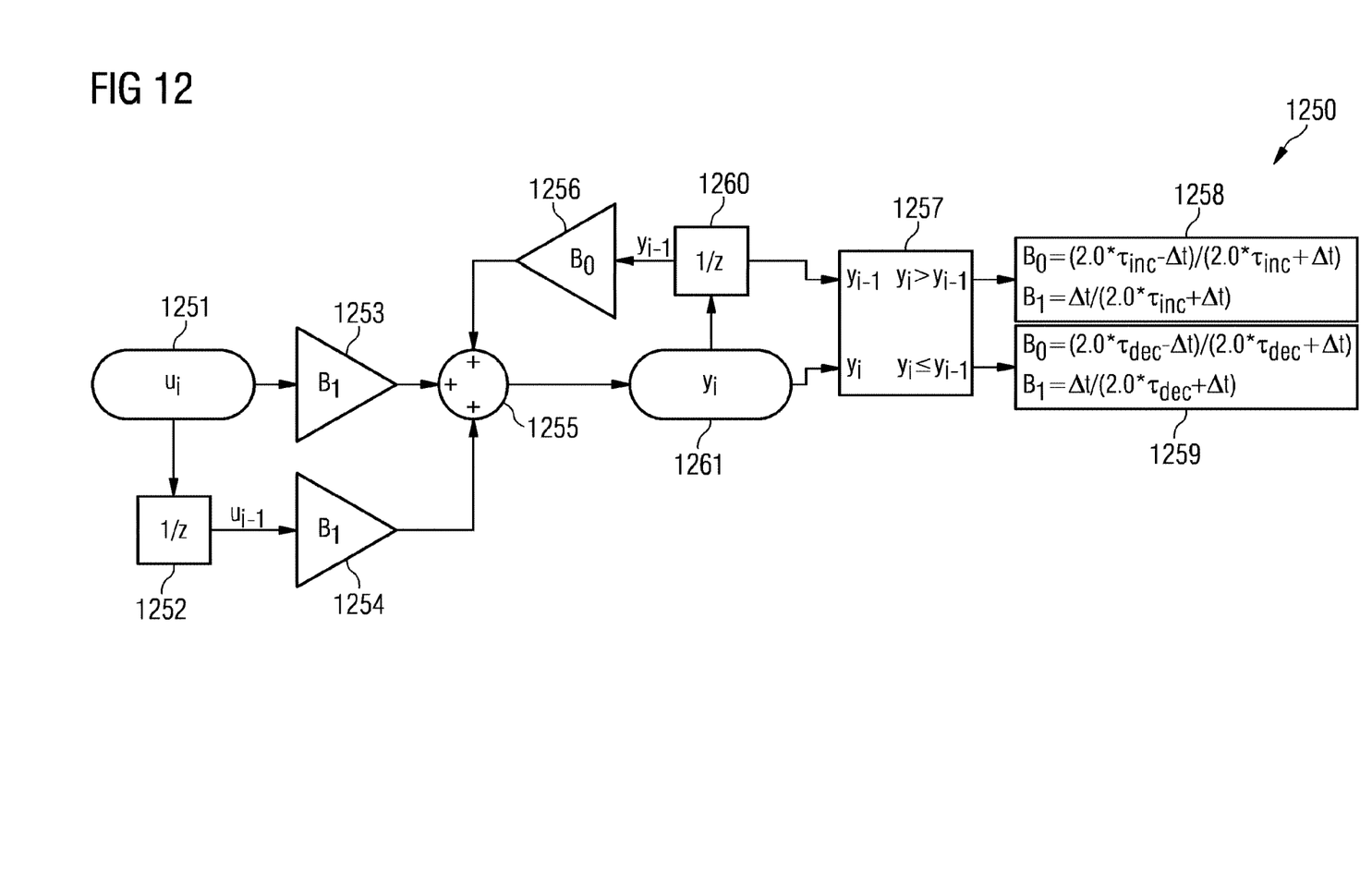
FIG. 12 schematically illustrates an implementation of a filter used in embodiments of the present invention.

FIG. 12 schematically illustrates an implementation of a filter 1250 (e.g., executing by a processor and comprised e.g., in arrangement 110 illustrated in FIG. 1) used in embodiments of the present invention to derive a filtered signal (e.g., $y_i$, e.g., output by a filter module 1250) at a discrete time step i.

At an input module 1251 a measuring signal dependent quantity $u_i$ at this time step i is received.

A delay module 1252 generates therefrom the measuring signal dependent quantity $u_{i-1}$ at the previous time step i−1.

The measuring signal dependent quantity u at the time step i and the measuring signal dependent quantity $u_{i-1}$ at the previous time step are provided to gain modules 1253, 1254 having same gain coefficients $B_1$ and $B_1$.

At an addition element 1255 the outputs of modules 1253 and 1254 are added to the output of gain module 1256 having gain coefficient $B_0$ different than gain coefficient $B_1$. The gain module 1256 receives the filtered signal $y_{i-1}$ at step i−1 from a delay element 1260 which in turn receives the filtered signal $y_i$ at time step i from box 1261.

The output of the adder 1255 (provided to box 1261) is the filtered signal $y_i$ at the discrete time step i.

This output, i.e., filtered signal $y_i$, is provided to gain change module 1257 that changes the gain coefficients as indicated in boxes 1258, 1259 depending on whether the filtered signal $y_i$ at step i is greater of smaller than filtered signal $y_{i-1}$ at step i−1.

Filter coefficients (e.g., $B_0$ and $B_1$) may be defined by a time constant (e.g., $\tau$), and the time duration between samples (timestep), $\Delta t$. The time constant may be dependent on whether the output $y_i$ is larger or smaller than the previous output sample, $y_{i-1}$.

The following expression determines the output, i.e., filtered signal $y_i$ for time step i:

$$y_i = B_1 u_i + B_1 u_{i-1} + B_0 y_{i-1}$$

The filter coefficients $B_0$ and $B_1$ are defined by the time constant, $\tau$, and the time duration between samples (timestep), $\Delta t$.

$$B_0 = (2.0\tau - \Delta t)/(2.0\tau + \Delta t)$$

$$B_1 = \Delta t/(2.0\tau + \Delta t)$$

The time constant is dependent on whether the output vi is larger or smaller than the previous output sample, $y_{i-1}$:

If $y_{i-1} > y_i$ is, then $\tau = \tau_{increasing}$
If $y_{i-1} \leq y_i$ is, then $\tau = \tau_{decreasing}$ Other equations are possible to derive the filtered signal.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of activating and/or deactivating a safe mode of operation of a wind turbine, the method comprising:
    receiving at least one measurement signal related to a weather condition;
    filtering of a measuring signal dependent quantity to obtain a filtered signal, wherein the filtered signal depends on whether the measuring signal dependent quantity and/or the filtered signal is increasing or decreasing with time; and
    activating and/or deactivating the safe mode of operation based on the filtered signal, wherein activating and/or deactivating the safe mode of operation comprises supplying a control signal to at least one actuator for establishing the safe mode of operation;
    wherein the safe mode of operation comprises shutting down the wind turbine;
    wherein filtering includes employing a filter parameter, the filter parameter comprising a filter time constant being different for an increasing or decreasing measurement dependent quantity and/or filtered signal.

2. The method according to claim 1, comprising:
    activating the safe mode of operation if the filtered signal is above or below an activation threshold; and/or
    deactivating the safe mode of operation if the filtered signal is below or above a deactivation threshold same as or different from the activation threshold.

3. The method according to claim 1, wherein filtering includes low-pass, filtering employing the filter parameter.

4. The method according to claim 2, wherein for a case that the safe mode of operation is activated, if the filtered signal is above the activation threshold and the safe mode of operation is deactivated, if the filtered signal is below the deactivation threshold the following applies:
    the time constant is set to a low time constant when the measuring signal dependent quantity and/or the filtered signal is increasing; and
    the time constant is set to a high time constant when the measuring signal dependent quantity and/or the filtered signal is decreasing, wherein the high time constant is greater than the low time constant.

5. The method according to claim 4, wherein the activation threshold is greater than the deactivation threshold, wherein the activation threshold is between 1.2 and 2.0 times the deactivation threshold.

6. The method according to claim 2, wherein for a case that the safe mode of operation is activated, if the filtered signal is below the activation threshold and the safe mode of operation is deactivated, if the filtered signal is above the deactivation threshold, the following applies:
    the time constant is set to a high time constant when the measuring signal dependent quantity and/or the filtered signal is increasing; and the time constant is set to a low time constant when the measuring signal dependent quantity and/or the filtered signal is decreasing, wherein the high time constant is greater than the low time constant.

7. The method according to claim 4,
wherein the low time constant is between 0 and 60 minutes, and/or
wherein the high time constant is between 30 minutes and 300 minutes.

8. The method according to claim 1, wherein filtering of the measuring signal dependent quantity comprises:
averaging the measurement signal over a predetermined averaging time to obtain an averaged signal;
filtering the averaged signal to obtain the filtered signal.

9. The method according to claim 8,
wherein the predetermined averaging time is between 120 seconds and 700 seconds.

10. The method according to claim 2,
wherein filtering of the measuring signal dependent quantity comprises:
limiting the measurement signal dependent quantity to be equal or greater than a floor value not greater than the activation threshold; or
limiting the measurement signal dependent quantity to be equal or lower than a ceiling value not lower than the deactivation threshold;
the method further comprising:
filtering the limited measuring signal dependent quantity.

11. The method according to claim 1,
wherein the measurement signal related to the weather condition comprises a measurement signal (112) of at least one of the following:
a wind speed,
an atmospheric pressure,
a load on a rotor blade and/or tower;
a thrust on turbine rotor.

12. The method according to claim 1,
wherein the method is applied to a plurality of types of measurement signals each being associated with a respective type dependent filter parameter and activation and deactivation threshold.

13. The method according to claim 1, wherein activating and/or deactivating the safe mode of operation comprises supplying a control signal to at least one actuator for establishing the safe mode of operation,
wherein a safe mode of operation comprises at least one of:
folding leewards at least one rotor blade;
adjusting a blade pitch angle of at least one rotor blade to a feathered position;
adjusting or allowing to adjust the yaw to a downwind position;
idling in yaw downwind position;
disconnecting the wind turbine from the electrical grid;
securing and/or braking the rotor.

14. An arrangement for activating and/or deactivating a safe mode of operation of a wind turbine, the arrangement comprising:
an input module configured to receive at least one measurement signal related to a weather condition;
a processor configured to:
filter a measuring signal dependent quantity to obtain a filtered signal, wherein the filtered signal depends on whether the measuring signal dependent quantity and/or filtered signal is increasing or decreasing with time;
derive at least one control signal for activating and/or deactivating the safe mode of operation based on the filtered signal,
wherein the arrangement is configured, for activating and/or deactivating the safe mode of operation, to supply the control signal to at least one actuator for establishing the safe mode of operation,
wherein the safe mode of operation comprises shutting down the wind turbine,
wherein the processor is configured to filter the measuring signal dependent quantity employing a filter parameter, the filter parameter comprising a filter time constant being different for increasing or decreasing measurement signal dependent quantity and/or filtered signal.

15. A wind turbine, comprising:
a tower;
a nacelle mounted on top of the tower;
a rotor harboured in the nacelle;
a plurality of rotor blades mounted on the rotor;
an arrangement according to claim 14;
a measurement sensor configured to generate the measurement signal in dependence of a weather condition;
an actuator for receiving the control signal.

* * * * *